Patented Aug. 17, 1937

2,090,140

UNITED STATES PATENT OFFICE 2,090,140

COATING COMPOSITIONS

John D. Murray, Chicago, Ill., assignor to The Murray Liquafilm Corporation, Chicago, Ill., a corporation of Illinois No Drawing. Application March 24, 1934, Serial No. 717,275

12 Claims. (Cl. 134—17)

This invention relates to compositions for coating paper and other sheet material, and is herein described with reference to the provision of a transparent protective coating for printed matter and the like.

An object of the invention is to provide a composition of the desired character which will have a high resistance to water and moisture, which is not expensive, which has substantially no odor, which can be applied by machinery at a high rate of speed and still give a uniform but very thin coating, and which has a pleasing appearance.

I prefer also in most cases to include an ingredient which renders the surface slippery, to facilitate feeding and otherwise handling the coated paper during subsequent operations.

A coating material which forms a coating which is highly resistant to water and moisture includes (dissolved in a solvent such as one or a mixture of benzol, toluol, xylol, or high-flash naphtha), a soluble rubber compound (such as chlorinated rubber), a plasticizer (such as tricresyl phosphate, diamyl phthalate, or the like), an artificial or natural resin, and a wax such as paraffine. I find the most desirable proportions to be four parts of the rubber compound, two and one-half or three parts of the plasticizer, two to three parts of the resin, and one part of the paraffine. One-half part of mineral oil may, if desired, be added as noted below.

This composition is very advantageous where the utmost in moisture-proofing is desired. On the other hand, while it has a high degree of translucence, and in thin layers is substantially transparent, it has a brown color which restricts its use for some purposes.

On the other hand, where a fair degree of moisture resistance is sufficient, a very colorless coating of pleasing appearance can be obtained by dissolving, in the described solvent, processed linseed oil or the like and blown wood oil (preferably three parts of the first to one part of the second), together with a cellulose compound (preferably four parts) such as cellulose nitrate, cellulose acetate, ethyl cellulose, benzyl cellulose, or other cellulose ester.

For many purposes, in place of the processed linseed oil and blown wood oil (i. e. such oils which have been heat treated or through which air has been blown until they reach a jellylike consistency), there may be used soya bean oil, tung oil, perilla oil, castor oil, or mineral oil, similarly processed or treated.

Another very clear solution, which may be used in place of the one just described, includes approximately ten parts cellulose ester, six parts plasticizer such as tricresyl phosphate or diamyl phthalate, four to five parts of a resin such as ester gum, 1¼ parts paraffine, with ¾ parts mineral oil if desired.

In most cases it is desirable to secure the utmost in appearance, with the degree of moisture-proofing required, by mixing the two above sub-formulae, using as little of the first composition as necessary to give the desired degree of moisture-proofing.

To the solution so obtained, as noted above, there may if desired be added a very small quantity of water white clear mineral oil such as that known commercially as "special American mineral oil". This oil complies with the U. S. P. requirements for "White oil" and has a flash point from 380° F. to 385° F., Saybolt viscosity at 100° F. of 280 to 285 seconds, specific gravity of .8871 to .8844 and a pour point of 0° F. This does not solidify when the coating is dried by heating to drive off the solvent, and neither is it driven off with the solvent. It remains in the pores of the dried coating, not only adding to the moisture-proof effect but also gradually oozing to the surface and keeping it somewhat slippery but without rendering it greasy to the touch. This greatly facilitates handling the coated sheets in subsequent operations, as for example in feeding coated printed blanks to packaging machinery. It also adds greatly to the plasticity of the film and reduces its brittleness, especially when applied to paper.

The following are examples of specific compositions which I have found effective, each being used with the above-described solvent:

1. | Parts
---|---
Cellulose ester | 13
Chlorinated rubber | 3
Tricresyl phosphate or diamyl phthalate | 8
Ester gum | 5
Paraffine | 1.5
Processed linseed or wood oil | 6

2. | Parts
---|---
Cellulose ester | 10
Ester gum | 5
Chlorinated rubber | 3
Tricresyl phosphate or diamyl phthalate | 5
Mineral oil (if desired) | 1.75

3. | Parts
---|---
Chlorinated rubber | 8
Tricresyl phosphate or diamyl phthalate | 5
Resin such as ester gum | 4
Paraffine | 2
Mineral oil (if desired) | 1

4.

| | Parts |
|---|---|
| Cellulose ester | 4 |
| Processed linseed oil | 6 |

5.

| | Parts |
|---|---|
| Cellulose ester | 4 |
| Processed linseed oil | 4 |
| Blown wood oil | 2 |

6.

| | Parts |
|---|---|
| Cellulose ester | 4.2 |
| Tricresyl phosphate or diamyl phthalate | 2.5 |
| Ester gum | 2 |
| Gelled castor oil | 1.75 |
| Paraffine | .25 |
| Mineral oil (if desired) | .25 |

7.

| | Parts |
|---|---|
| Cellulose ester | 10 |
| Plasticizer | 6 |
| Resin such as ester gum | 4 to 5 |
| Paraffine | 1¼ |
| Mineral oil (if desired) | ¾ |

(Note: No. 7 solution is very clear, and as explained above it may be mixed in any desired proportion with one of the darker compounds having a higher degree of moisture-proofing, such as No. 3 above.)

8.

| | Parts |
|---|---|
| Cellulose ester | 2 |
| Processed linseed oil | 3 |
| Blown (i. e. processed) wood oil | 1 |
| Chlorinated rubber | 8 |
| Tricresyl phosphate | 6 |
| Ester gum resin | 4 |
| Paraffine wax | 2 |
| Mineral oil (if desired) | 1 |

9.

| | Parts |
|---|---|
| Chlorinated rubber | 8 |
| Tricresyl phosphate or other plasticizer | 5 |
| Ester gum or other resin | 4 |
| Paraffine wax | 2 |
| Mineral oil (if desired) | 1 |

10.

| | Parts |
|---|---|
| Chlorinated rubber | 8 |
| Paraffine wax | 2 |
| Tricresyl phosphate | 5 |
| Mineral oil | 2 |
| Ester gum resin | 4 |

11.

| | Parts |
|---|---|
| Chlorinated rubber | 4 |
| Processed oil | 8 |
| Paraffine wax | 1 |

12.

| | Parts |
|---|---|
| Cellulose ester | 10 |
| Ester gum or other resin | 5 |
| Chlorinated rubber | 3 |
| Mineral oil | 2 |
| Plasticizer such as tricresyl phosphate | 6 |
| Paraffine wax (of relatively high melting point) | 2 |

One well-known commercial form of soluble rubber compound which may be used in these formulae is the chlorinated rubber sold under the name of tornesit. Where it is desired that the coating be one which will soften with heat, for example for use in coating wrappers which are to be sealed by heating in the manner now common with wrappers heavily impregnated with paraffine wax, instead of chlorinated rubber I may use one of the lower-melting-point "plioform" or vinyl or isoprene or other rubber-derivative resins. Other soluble compounds of rubber and equivalent rubberlike materials may be used for special purposes.

The above compositions, usually containing about 50% of "solids" (i. e. material remaining in the coating after evaporation of the solvent), may be applied by the method described and claimed in my Patent No. 2,000,347, issued May 7, 1935, being applied (preferably under pressure) as a partly-dried viscous coating which, while it enters the pores of the paper sufficiently to be thoroughly bonded thereto, does not enter the structure of the paper enough to blur or otherwise affect the ink making up the printed matter on the paper.

While several specific compositions, and their advantages, have been described in detail, it is not my intention to limit the scope of the invention to those particular compositions, or otherwise than by the terms of the appended claims.

I claim:

1. A coating composition comprising a solvent containing cellulose derivative material of the class consisting of esters and ethers and blown linseed oil and blown wood oil, mixed with a composition containing chlorinated rubber.

2. A composition of matter comprising four parts chlorinated rubber, three parts plasticizer, two parts resin, and one part wax.

3. A coating composition comprising a solvent containing a mixture of cellulose derivative compound of the class consisting of esters and ethers, blown linseed oil, blown wood oil, chlorinated rubber, plasticizer, resin and paraffine.

4. A coating composition consisting of a solvent containing a mixture of two parts cellulose derivative compound of the class consisting of esters and ethers, three parts of blown linseed oil; one part of blown wood oil, four parts chlorinated rubber, three parts plasticizer, two parts resin and one part paraffine.

5. A coating composition comprising one part of cellulose derivative material of the class consisting of esters and ethers, at least one fourth part of chlorinated rubber, at least one half part of ester gum and at least one half part of plasticizer of the class consisting of tricresyl phosphate and diamyl phthalate.

6. A coating composition comprising one part of cellulose derivative material of the class consisting of esters and ethers, at least one fourth part of chlorinated rubber, at least one half part of ester gum and at least one half part of plasticizer of the class consisting of tricresyl phosphate and diamyl phthalate to which has been added at least one tenth part of mineral oil.

7. A coating composition comprising one part of cellulose derivative material of the class consisting of esters and ethers, at least one fourth part of chlorinated rubber, at least one half part of ester gum and at least one half part of plasticizer of the class consisting of tricresyl phosphate and diamyl phthalate to which has been added not more than one part blown oil of the class consisting of linseed oil and wood oil and soya bean oil.

8. A coating composition comprising one part of cellulose derivative material of the class consisting of esters and ethers, at least one fourth part of chlorinated rubber, at least one half part of ester gum and at least one half part of plasticizer of the class consisting of tricresyl phosphate and diamyl phthalate to which has been added not less than one tenth part of paraffine wax.

9. A coating composition comprising two parts chlorinated rubber and one part ester gum and at least one part plasticizer of the class consisting of tricresyl phosphate and diamyl phthalate.

10. A coating composition comprising eight parts chlorinated rubber, five parts tricresyl phosphate, four parts ester gum.

11. A coating composition comprising thirteen parts cellulose ester, three parts chlorinated rubber, five parts ester gum and eight parts tricresyl phosphate.

12. A coating composition comprising eight parts chlorinated rubber, five parts tricresyl phosphate, four parts ester gum to which has been added two parts paraffine wax and one part mineral oil.

JOHN D. MURRAY.